March 8, 1960    A. W. SILVERSTEIN    2,927,796
RECORD DISPLAY AND ADVERTISING DEVICE
Filed Feb. 21, 1955    2 Sheets-Sheet 1

INVENTOR.
ABRAHAM W. SILVERSTEIN
BY
H. B. Roberts
ATTORNEY

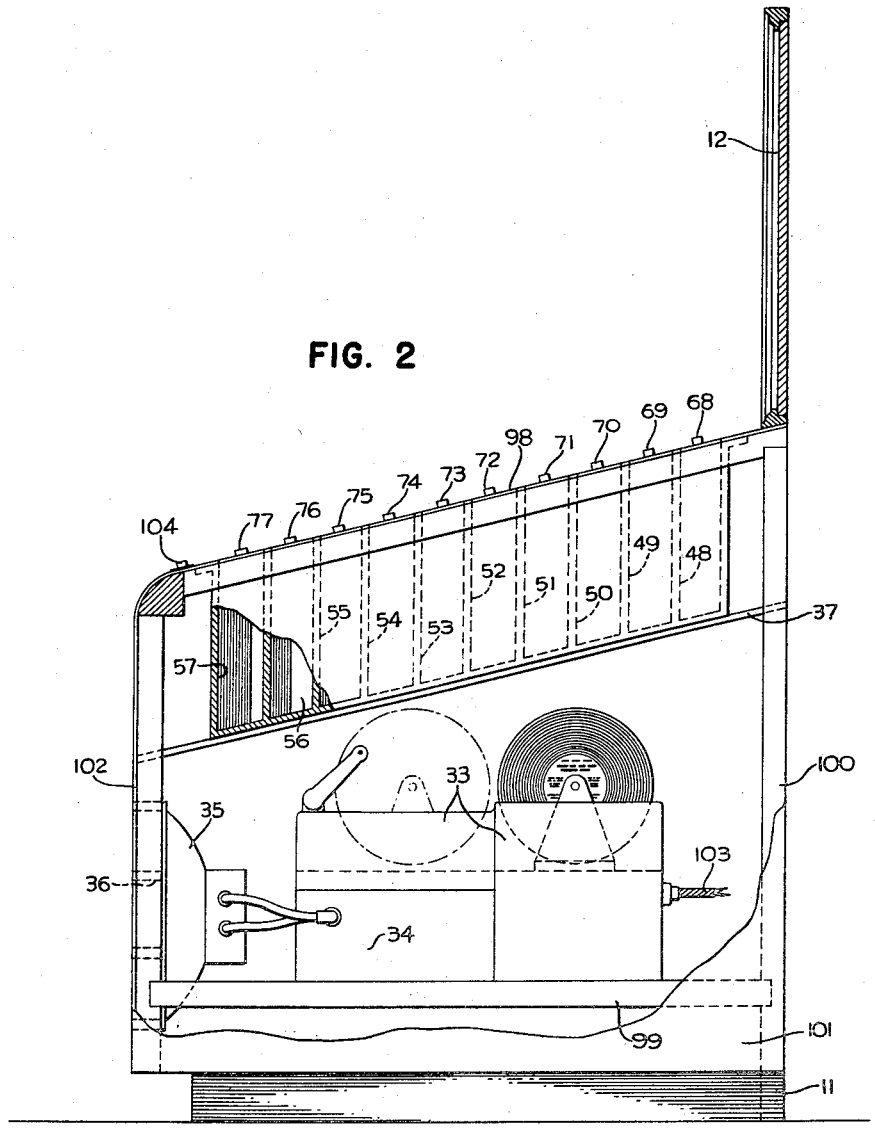

United States Patent Office 2,927,796
Patented Mar. 8, 1960

2,927,796

RECORD DISPLAY AND ADVERTISING DEVICE

Abraham W. Silverstein, Akron, Ohio

Application February 21, 1955, Serial No. 489,541

3 Claims. (Cl. 274—10)

This invention relates to a phonograph record display and advertising device.

In the merchandising of phonograph records, it has been the customary practice to provide a prospective customer with a record of his choice after which the customer would retire to a booth or cubicle which is provided with a turntable in order that he might evaluate the merits of the record. If he found the record acceptable, he would then consult with the clerk who would accept payment for the record and package the same for the customer. Thus, every sale required a minimum of two contacts with the clerk and the customer received a record that had been played one or more times. Because of the selective nature of record customers it has been quite common for the clerk to have as many as a dozen contacts with a customer before a sale is consummated. Also, the merchandiser must allow for considerable breakage because the customers are handling the records prior to the purchase. These disadvantages to the customary merchandising procedure are overcome by the practice of this invention because the customer never touches the record until he has decided on the purchase, the clerk has only one contact with the customer and all records are unplayed when purchased. Thus, breakage and clerk's time, two expensive items of overhead, are substantially reduced.

It is therefore a primary object of this invention to provide an improved combined merchandise display and advertising device which requires a minimum amount of attention.

Another object of this invention is to provide an improved combined record display and advertising device which will avoid the playing of each new record so that critical purchasers will be assured of obtaining unplayed records.

A further object of this invention is to provide an improved combined record display and advertising device in which the merchandise is readily available to the customer and is advantageously displayed.

It is still another object of this invention to provide an improved combined record display and advertising device which is compact in construction, pleasing to the eye and economical and efficient in use.

A further object to this invention is to provide a self-service record display and advertising device which requires a minimum of attention from attendants.

These and other objects will be apparent as the description proceeds.

In the practice of this invention, a cabinet having a plurality of vertical bins or receptacles is provided wherein the bins or receptacles are exposed to view so that the records are always on display and readily available to the purchaser. Associated with the cabinet is a selection board containing the names of the records which are being displayed.

Combined with the selection panel and the display bins is a unitary selector-player having a turntable and sound pick-up, and having associated therewith an amplifier, and speaker. The selector-player is connected with each bin through a series of circuits so that a prospective customer can select and automatically play a record of his choice without handling the record or viewing the translation.

The invention will be more fully understood in connection with the drawings wherein:

Figure 2 is a cross section showing schematically the selections panel, the bins and the reproduction apparatus in relation to the cabinet.

Figure 1:
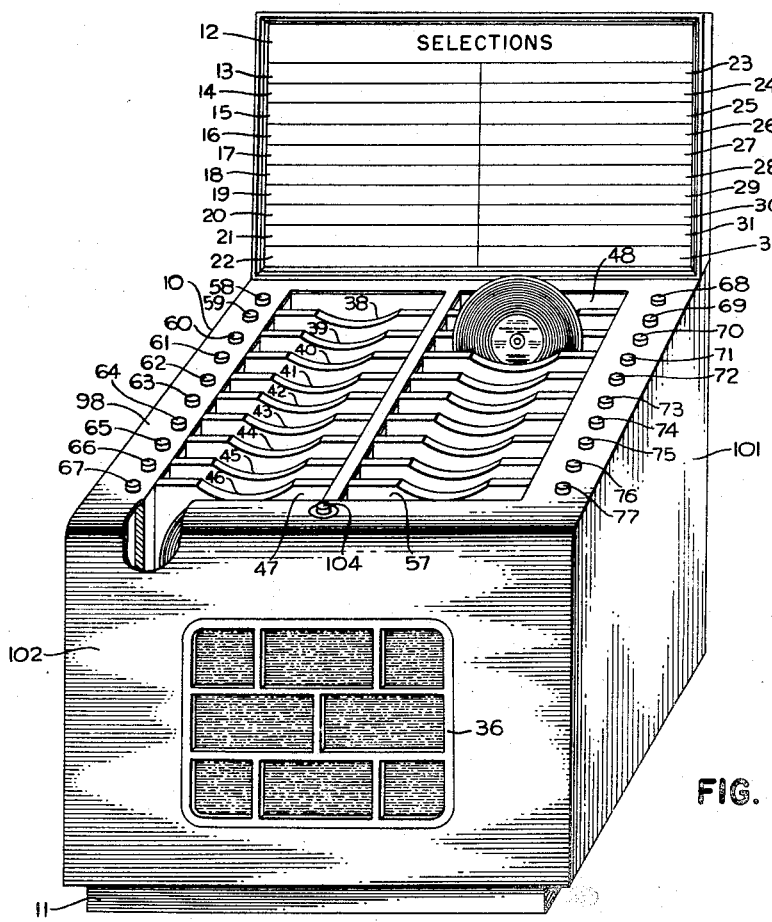
Figure 1 is a perspective view of one embodiment of this invention with a portion thereof cut away to show a bin full of records and one of the selector-player circuits.

Referring in particular to the drawings, a cabinet 10 is mounted on a base 11 and has an elevated selections panel board 12 secured to and projecting above the upper surface 98 of the cabinet. The cabinet 10 is comprised of four sides which are in the nature of vertical panels 100, 101, 102 and a fourth unexposed panel associated together as parallel pairs to enclose the mechanism of reproduction, the wiring and the record bins. The upper surface 98 which is mounted at an inclined angle with the rear portion thereof slightly elevated so that the record bins and push buttons are available for ready access and easy use. The top surface 98 is parallel to the inclined transverse support 37 which may be attached to side panels 100 and 102 or may be suspended from the top surface panel 98.

The selections panel board 12 contains a plurality of spaces 13—32 adapted to receive song titles. The base 11 is provided with a conventional record selector-player 33 unitarily mounted on a transverse supporting member 99 which is supported by the cabinet 10 and base 11.

The selector-player can be adaptable to play the standard 78 r.p.m., the long playing 33 r.p.m., or 45 r.p.m. records, or may be in the nature of any other type of reproduction device suitable for actuation through an electrical circuit. In connection with the operation of the record selector-player 33, an amplifier 34 and a speaker 35 are mounted on the cabinet 10 in such manner as to allow the sound to project through the grid 36 which is mounted in and forms a part of the front panel of the cabinet.

A transverse supporting element 37 is secured to the cabinet 10 in a plane above the record selector-player 33 for the support of a plurality of record bins 38—57, each of the bins containing a store of records corresponding to the listings on the selections panel board.

The bins 38—57 are mounted substantially vertically between the transverse supporting element 37 and the upper surface panel 98 and are adapted to hold a store of unplayed records for prospective purchasers. The bin dividers may have partial elliptical segments removed from the upper portion in order to facilitate access to the records in the bins.

Selector push button switches 58—77 are mounted on the upper surface panel 98 of said cabinet 10 in integral relation with the corresponding bins and numbered according to the corresponding positions 13—32 on said selections panel board. Each of the selector push button switches is adapted to actuate one of the circuits through the record selector-player 33 which initiates the playing of the selected record, said record selector-player being supplied with power through the line 103.

Figure 3:
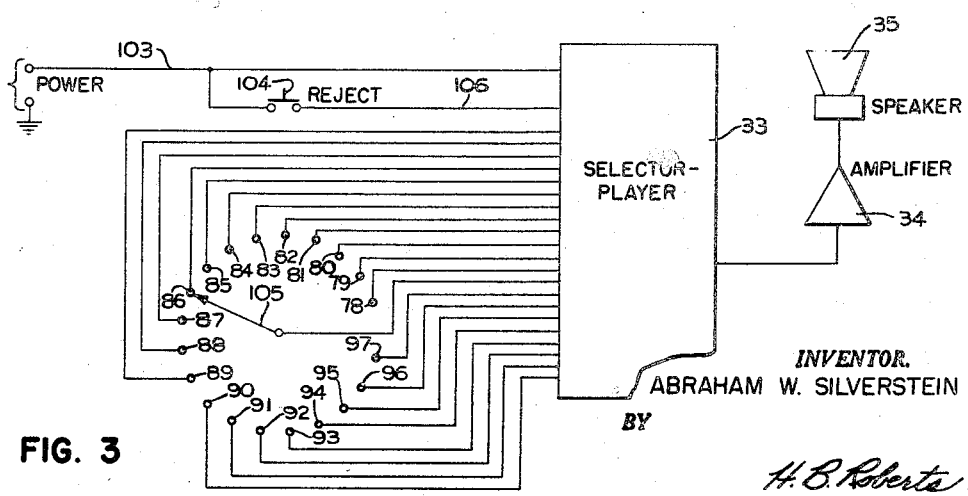
Figure 3 is a schematic drawing of the circuits showing a rotary switch having positions corresponding to the bins in Figure 1 and showing the selector-player circuits in coacting relation with a unitary selector-player, amplifier and speaker.

For the purpose of simplicity the individually acting push button switches 58—77 of Figure 1 are shown diagrammatically as a rotary switch 105 having contact points 78—97 as shown in Figure 3. It will be appreciated that either of these arrangements may be utilized or other equivalent means of actuating the record selector-player may be utilized although the arrangement of Figure 1 is to be preferred with regard to simplicity and ease of operation.

Reject push button 104 can actuate the reject circuit 106 in order to effect removal of any record during the reproduction. Otherwise, the record selector-player 33 is adapted to complete a reproduction after which the record is returned automatically to the proper storage space.

In the practice of this invention, it is thus possible for a prospective record customer to select a record from the record selections panel and push the selector push button corresponding in number to the record selected from the panel board and thus actuate the selector-player which in turn reproduces the chosen record through the amplifier and speaker. If the customer does not desire to listen to the complete record, he can depress the reject button which in turn actuates the reject circuit, thus returning the record to its normal position in the record rack of the selector-player. Thereafter, the customer can select another record from the selections board and receive a reproduction by pushing the corresponding numbered selector push button and reject the same prior to completion by depressing the reject button. This cycle can be completed over and over again until the customer has made his selections after which he can remove for purchase unplayed packaged records from the display bins. It is therefore apparent that the record display and advertising device of this invention is readily adaptable to the merchandising of records through such outlets as grocery stores, drug stores, recreation halls and other places where people congregate with an absolute minimum of overhead due to breakage and clerk's time.

While certain representative embodiments and details have been shown for the purpose of illustrating the invention, it will be apparent to those skilled in this art that various changes and modifications may be made therein without departing from the spirit or scope of the invention.

I claim:

1. A record display and advertising device comprising in combination a cabinet having a numbered selections panel mounted thereon adapted for the retention of song titles and having a unitary selector-player contained therein adapted for the playing of the multiplicity of records, said cabinet having a plurality of record bins formed by parallel vertical coextensive dividers, said bins being numbered to correspond to said numbered selections panel and having adjacent thereto numbered electrical player circuit actuating push buttons numbered to correspond to the numbers of said bins and said record selections panel, said buttons being capable of actuating a selector switch, said selector switch containing circuit stations corresponding to said numbered push buttons and being electrically coupled to said selector-player to connect the stations of said selector switch and the corresponding record holder mounted in said selector-player which holds records corresponding to the same numbers on said record selections panel and said corresponding push buttons and a reject push button mounted on said cabinet connected to said selector switch adapted to interrupt a translation and return the record of translation to its position in the record rack, said selector-player containing translating means and having an amplifier and speaker associated therewith for reproducing the translations from records by said selector-player.

2. A record display and advertising device comprising in combination a cabinet having a numbered selections panel mounted thereon adapted for the retention of song titles and having a unitary selector-player contained therein adapted for the playing of a multiplicity of records, said cabinet having a plurality of tiered record bins formed by parallel vertical coextensive dividers, said bins being numbered to correspond to said numbered selections panel and having adjacent thereto numbered electrical player circuit actuating push buttons numbered to correspond to the numbers of said bins and said record selections panel, said buttons being capable of actuating a selector switch, said selector switch containing circuit stations corresponding to said numbered push buttons and being electrically coupled to said selector-player to connect the stations of said selector switch and the corresponding record holder mounted in said selector-player which holds records corresponding to the same numbers on said record selections panel and said corresponding push buttons, said selector-player containing translating means and having an amplifier and speaker associated therewith for reproducing the translations from records by said selector-player, and said record display and advertising device having a reject push button mounted externally on the cabinet adapted to actuate a record replacing means in said selector-player through a reject circuit connecting the reject push button and selector-player, affording external control over said play back means to interrupt said translation.

3. An advertising and display device comprising in combination a base, a cabinet, a unitary record selector-player adapted for the playing of a multiplicity of records supported on said base, a supporting frame secured to said base and having a transverse element positioned in a plane above the record selector-player for supporting a plurality of record bins, said bins being an integral part of said cabinet and formed by vertical parallel coextensive dividers, each of said bins having a corresponding selector push button switch mounted on said cabinet adjacent to said bins for actuation of a corresponding station in the said record selector-player in order to actuate the translation of a selected record, said cabinet having a record reject button mounted thereon for actuation of a record reject circuit connecting said reject button and said selector-player affording external control over the play back means to interrupt the translation of the said record selector-player and a record advertising selections panel mounted on the back of said cabinet in substantially elevated relation to said cabinet.

References Cited in the file of this patent

UNITED STATES PATENTS

| | | |
|---|---|---|
| 2,096,718 | Hokanson | Oct. 26, 1937 |
| 2,375,043 | Shaffer | May 1, 1945 |
| 2,631,856 | Osborne | Mar. 17, 1953 |